No. 821,423. PATENTED MAY 22, 1906.
G. A. LOWRY.
PROCESS OF GINNING COTTON.
APPLICATION FILED APR. 23, 1900.
4 SHEETS—SHEET 2.
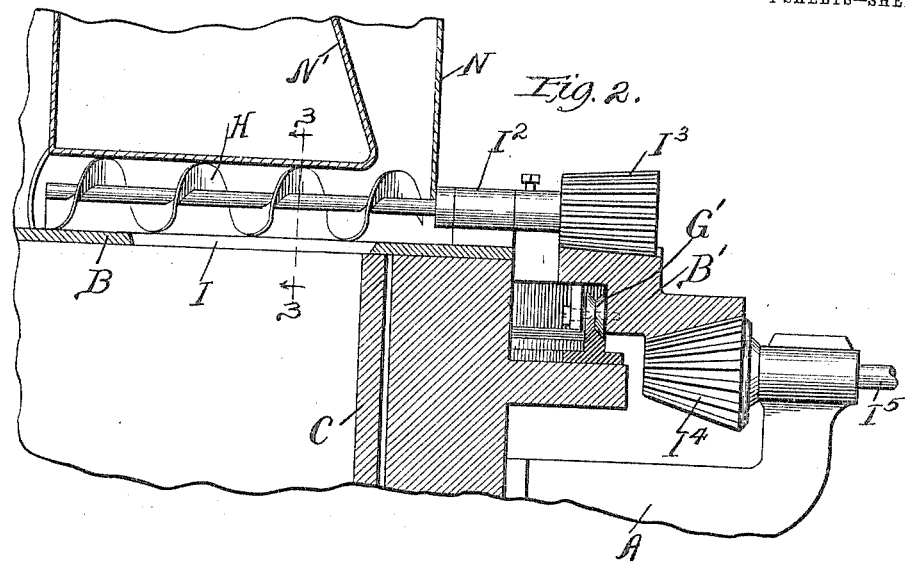
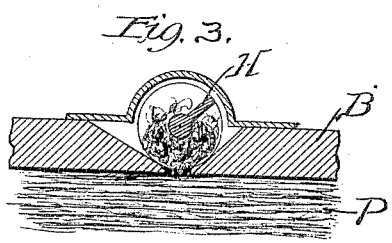
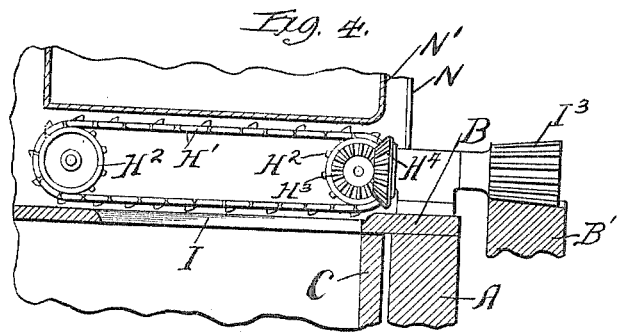
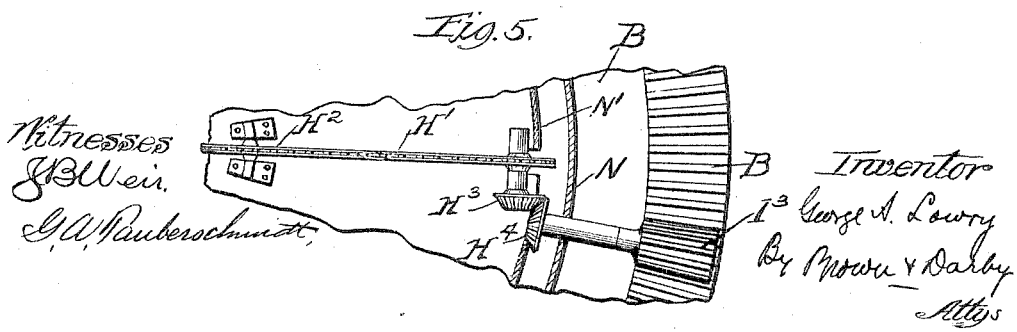
Witnesses
S. B. Weir.
G. A. Rauberschmidt.
Inventor
George A. Lowry
By Brown & Darby
Attys

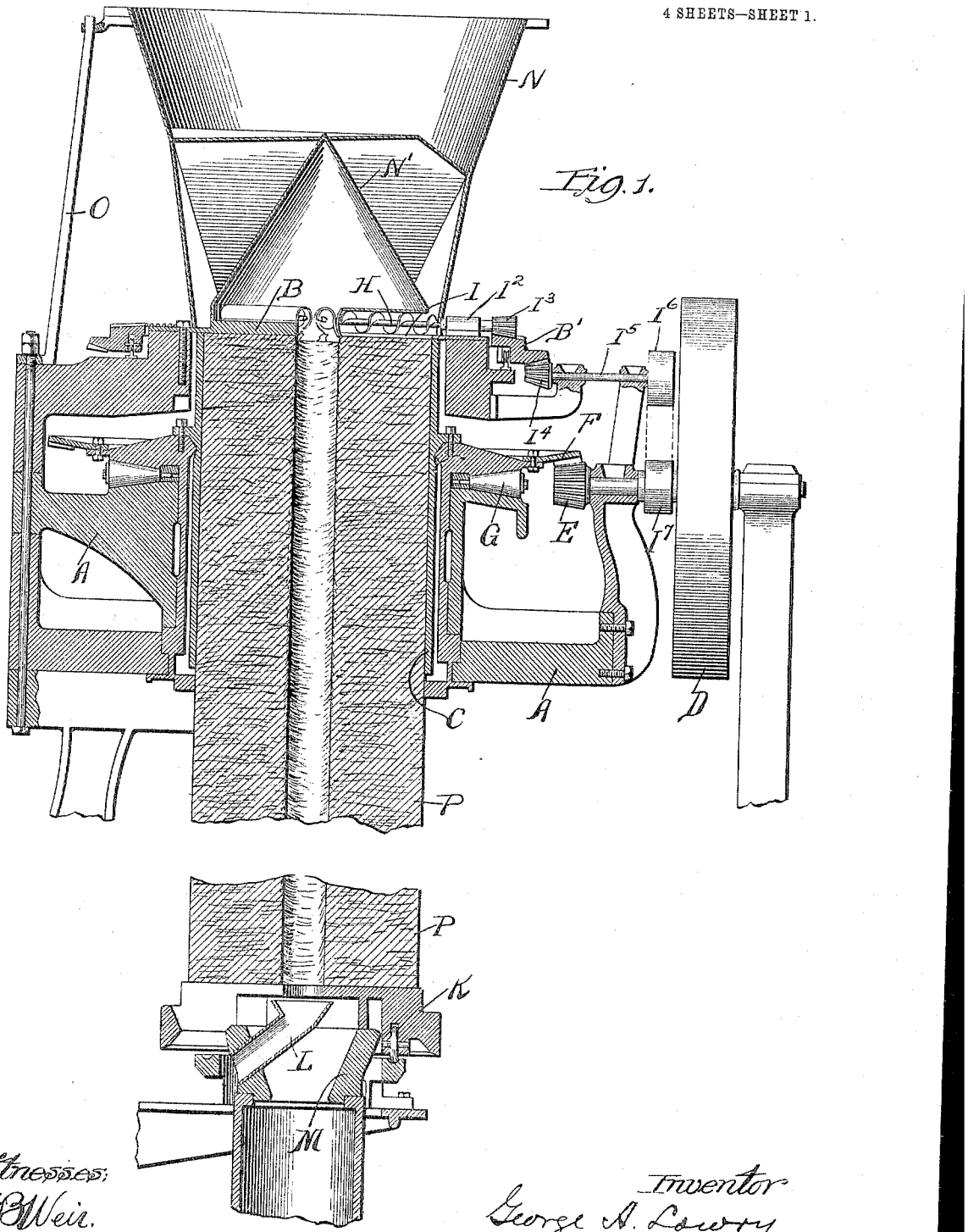

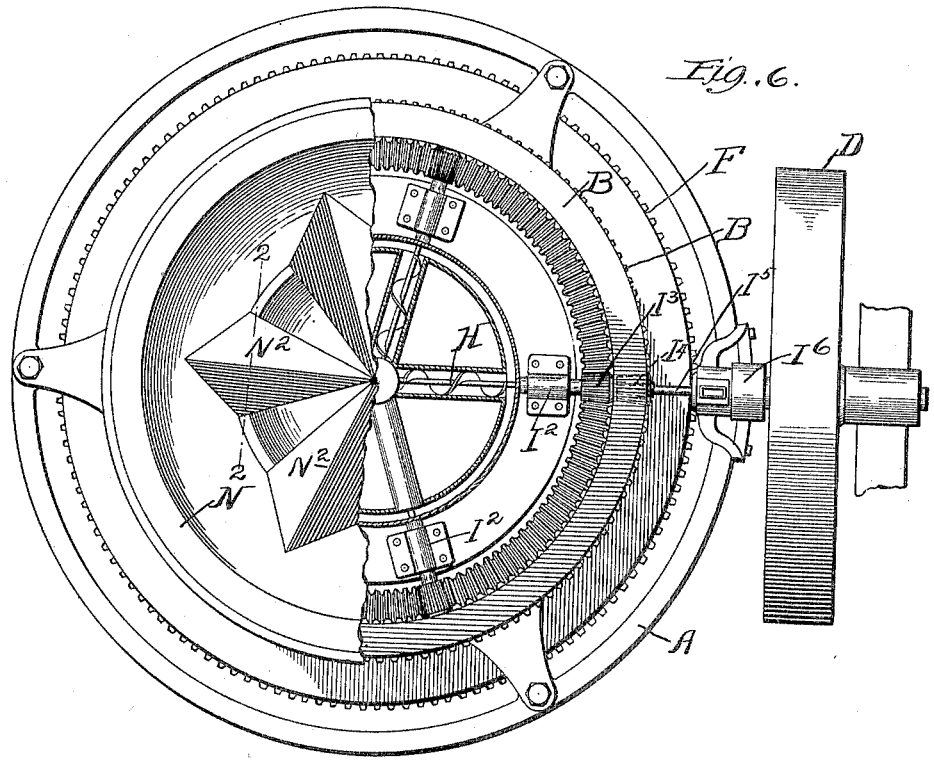
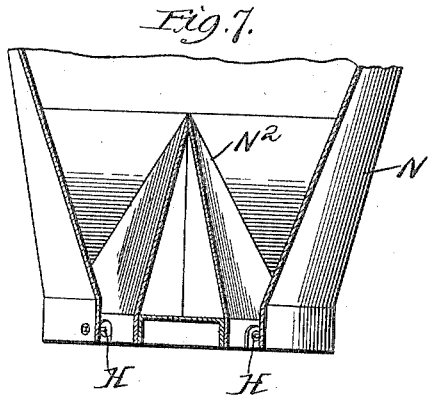

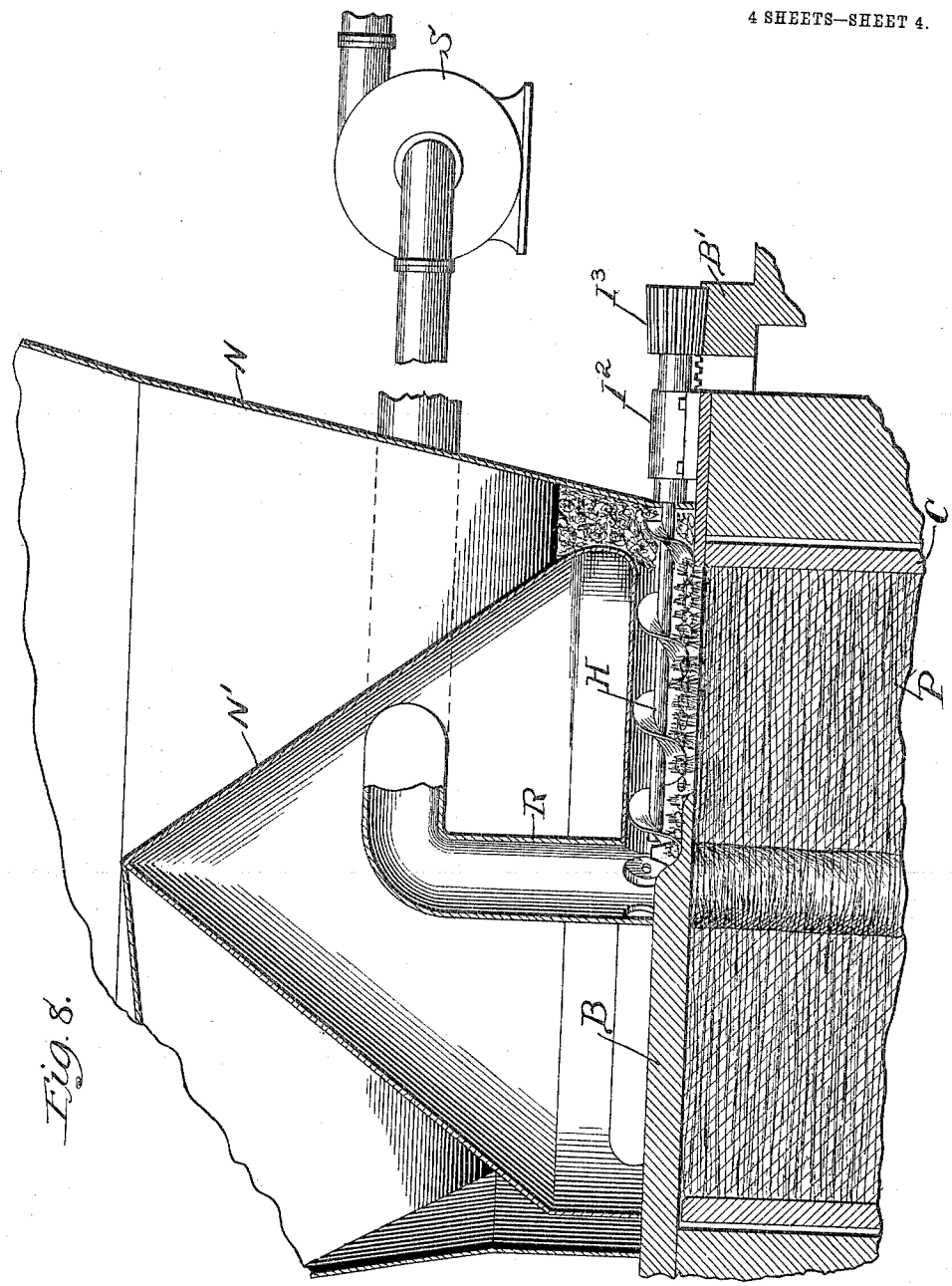

UNITED STATES PATENT OFFICE.

GEORGE A. LOWRY, OF CHICAGO, ILLINOIS, ASSIGNOR, BY MESNE ASSIGNMENTS, TO PLANTERS COMPRESS COMPANY, A CORPORATION OF MAINE.

PROCESS OF GINNING COTTON.

No. 821,423.　　　　Specification of Letters Patent.　　　　Patented May 22, 1906.

Application filed April 23, 1900. Serial No. 13,851.

*To all whom it may concern:*

Be it known that I, GEORGE A. LOWRY, a citizen of the United States, residing at Chicago, in the county of Cook and State of Illinois, have invented a new and useful Process of Ginning Cotton or other Fibrous Material, of which the following is a specification.

This invention relates to process of ginning cotton or other fibrous material.

The object of the invention is to provide an improved method of ginning cotton or similar material, whereby such material is removed from the seeds in a most thorough, efficient, simple, expeditious, and economical manner.

The invention consists, substantially, in the mode of procedure, as will be more fully set forth hereinafter and finally pointed out in the appended claims.

I have discovered that the fiber of seed-cotton and similar material may be thoroughly, efficiently, and expeditiously stripped or removed from the seeds by engaging said fiber with a moving mass of such resilient material maintained under pressure and restraining or preventing the seeds from movement with the mass, and I have discovered that the best results are obtained by engaging such fiber with a mass which moves in one direction and restraining the seeds from movement in the same direction, but to which seeds a progressing movement is imparted in another direction, thereby causing the fiber of the cotton to be most efficiently and thoroughly stripped from the seeds. In this manner I am enabled to overcome the adhesion of the fibers of the cotton or other material to its seeds and to forcibly remove the same from such seeds. The particular form of means whereby this beneficial result is attained may vary throughout a wide range of different mechanical constructions. In practice, however, I have found that one form of efficient means is to cause a mass of the cotton to exert a pressure, or the expansive force thereof, against a surface, said surface and mass being relatively moved, and to bring the seed-cotton into such relation to the relatively moving mass as to cause the fibers of such seed-cotton to become entangled with or to be gripped or engaged by the relatively moving mass, and thereby drawn or forcibly stripped from the seeds, the latter being restrained from following the stripping or drawing action exerted upon the fiber of the cotton—as, for instance, by effecting such drawing or stripping action upon the fiber through a narrow slit or opening provided in or through the surface against which the pressure or expansive force of the cotton or other material is exerted, and which slit or slot is sufficiently narrow to prevent the cotton-seeds from passing therethrough, and I have found that the best results and the most thorough work are accomplished when a travel is imparted to the seed material in a line intersecting the direction of pull or drawing action exerted upon the fiber thereof—that is, in the form of means above referred to by causing the seed material to move or travel lengthwise of or along the slot or opening through which the fiber is drawn.

It is evident that many specifically-different mechanical constructions may be devised and adapted for use in effecting the relative movement of the mass of material and the surface against which it exerts a pressure or expansive force. It is also evident that many specifically-different means may be devised and adapted for use in effecting the movement of the seed material.

In the accompanying drawings I have shown different forms of mechanism adapted for use in carrying my invention into practical operation; but inasmuch as my present invention does not reside in the mechanism or mechanical means or appliances employed it is to be understood that the particular forms shown are intended to be merely illustrations of operative means for carrying out my process.

Referring to the drawings and to the various views and reference-signs appearing thereon, Figure 1 is a vertical sectional view of one form of apparatus adapted for use in carrying out my invention. Fig. 2 is an enlarged detail in vertical section, parts broken off, of one form of conveying apparatus for the seed material. Fig. 3 is a detail view in section on the line 3 3, Fig. 2. Fig. 4 is a view similar to Fig. 2, showing another form of conveying apparatus adapted for use in carrying out my invention. Fig. 5 is a broken detail view in top plan of the construction shown in Fig. 4. Fig. 6 is a view in plan of the construction shown in Fig. 1, parts of the covering over the conveyer being broken away. Fig. 7 is an enlarged detail of a form of feed-hopper, partly in section, on the line 2 2, Fig. 6. Fig. 8 is a broken view, in vertical section, of another form of mechanism adapted for use in carrying out my invention.

Reference-sign A designates a suitable framework, in which is mounted an open-ended chamber or holder C, and B is a cap or head-plate for one end of such chamber or holder, said cap or head-plate being provided with one or more slots or openings I therethrough and arranged to extend in a general radial direction. The chamber or holder C is designed to contain the mass P of material which is to exert a pressure or the expansive force thereof against the inner surface of the cap or head-plate B. Relative movement may be imparted to this mass and the head-plate or cap in any suitable manner. In the particular form shown a pulley D is driven from a convenient source, and through the engagement of gear E thereon with a rack F, secured to or carried by a flange projecting from or connected to the chamber or holder, said chamber or holder is rotated, the cap or head-plate being held stationary. To reduce friction, the chamber or holder may be supported upon antifriction-rollers G, as shown. It is obvious that other forms of gearing and construction for securing relative movement of the chamber or holder and the cap or head-plate might readily be substituted for that shown and above described, so far as the present invention is concerned, and equally well answer the purpose in view, or the chamber or holder may be held stationary while the head-plate is rotated, or they might both be rotated, but in different directions or at different speeds.

The slot I should extend toward the center of the cap or head-plate and should be of such transverse area as to prevent the seeds of the cotton from passing therethrough, while permitting the cotton fiber to be drawn through.

Reference-sign N designates a suitable feed-hopper into which the material to be ginned is placed. A brace O may serve to steady this hopper. Within hopper N is arranged a conical deflector N', having the base thereof extending to a point adjacent to or beyond the outer end of the slot. By this arrangement the material to be ginned when placed in the hopper will be deflected down toward the perimeter of the cap or head-plate. In order to accomplish this result, bridges $N^2$ in the form of double-inclined sheds are provided and arranged to extend downwardly from the apex of the conical deflector and are of increasing width to the point where they join the deflector at the lower edge of the latter.

It will be readily seen that when the mass of material in the chamber or holder is exerting a pressure or an expansive force against the under surface of the head-plate or cap such material will tend to bulge or expand upwardly into the slot and that the surface of this bulged or expanded portion forms, with the lip of the slot, a contracting throat. Now when relative movement is imparted to this mass of material and the surface against which it exerts a pressure then the surface of such material, which bulges or expands into the slot by reason of the wave-like or rolling motion thereof during such relative movement, coöperates with the surface of the lip of the slot to exert a gripping action on the fibers of fresh material presented adjacent to the slot, and the outer surface of the head-plate or cap, thereby drawing such additional fiber into the chamber, and hence adding to the body of the mass of material contained therein, and by restraining the seeds of the seed-cotton or making the slot too narrow to permit the seeds to pass therethrough the fiber will be forcibly stripped from such seeds. In order to properly present the seed-cotton or other material to the slot, so that the fiber thereof may become entangled or engaged with the fiber of the mass of material which is exerting an expansive force or pressure on the inner surface of such head-plate or cap or so as to be efficiently gripped between the surface of that portion thereof which bulges or expands into the slot and the adjacent surface of the lip of the slot, a movement of the fresh material or seed-cotton along and lengthwise of the slot should be effected. Many specifically-different constructions may be devised and adapted for effecting this movement. In Figs. 1, 2, 6, and 8 of the accompanying drawings, H designates one form of conveyer adapted for this purpose. In Figs. 4 and 5 an endless-chain conveyer H' is shown. The conveyer H is in the form of a spiral plate or blade carried by a shaft, which is journaled in a bearing $I^2$ and carries at its outer end a pinion $I^3$, arranged to mesh with a double annular rack B', which is also engaged by a pinion $I^4$, carried by a shaft $I^5$, suitably journaled in the framework A and driven by a belt passing over pulleys $I^6$ $I^7$ from the main shaft. The double rack B' may be supported in any suitable manner, as by means of rollers G' upon a track carried by the main frame. By the arrangement and operation above set forth a longitudinal central opening through the mass of material P is produced, and by progressively moving the seed and seed-cotton along or lengthwise of the slot not only is the fiber efficiently and thoroughly stripped from the seed, but the seeds are finally delivered into the central opening through the mass of material and may be delivered therefrom through a delivery opening or pipe L or otherwise. The progressive movement of the material along or lengthwise of the slot should be so regulated and timed that when the length of the slot has been traversed the fiber will be entirely and thoroughly stripped from the seeds.

The desired pressure of the mass of material against the inner surface of the cap or head-plate in order to enable such material to exert an expansive force against such surface may be secured in any desirable or suitable manner—as, for instance, by means of a plunger M of a hydraulic jack—upon which is carried a base or support K, which engages the mass of material P.

In the form of conveyer shown in Figs. 4 and 5 the endless chain H' is provided with projections or teeth, and said chain is mounted above and in proximity to the slot and extends lengthwise thereof. This chain is carried over sprockets H², one of which may be driven by a bevel-gear H³, engaging a pinion H⁴ upon the inner end of the shaft which carries the pinion I'.

Instead of having the seeds drop through the central opening through the mass of material said seeds may be removed by a suction-blast or otherwise. A form of suction means is shown and which comprises a blower S and pipe R, through which the seeds may be drawn.

It is obvious that one or more slots may be employed in the head-plate, and the greater the number of slots the greater rapidity of action is secured. It is manifest, however, that the present invention is not dependent upon any specific construction or arrangement of apparatus and that the process may be carried out practically in a wide variety of constructions.

It is obvious that the mass of material drawn into the chamber or holder or which is added to the moving mass, as above explained and set forth, may at the same time be built up and compressed into a column of high density by the action described and in accordance with the principles set forth in my Patents Nos. 581,600 and 581,601, granted April 27, 1897, and No. 630,369, granted August 8, 1899, and from which column portions of the desired length to form commercial bales may be detached.

Having now set forth the object and nature of my invention and a manner of carrying the same into practical and successful operation, what I claim as new and useful and of my own invention, and desire to secure by Letters Patent, is—

1. The method of ginning cotton which consists in producing and withdrawing from a mass of seed-cotton a concatenation of fibers by the engagement therewith and relative movement of an expansive mass of ginned fiber, passing one end of said concatenation beneath a restraining-abutment having relative movement with respect to the ginned fiber, the continued relative movement of the ginned fiber with respect to the seed-cotton continuously producing a concatenation of fibers, and the continued relative movement of the abutment and the ginned fiber passing the concatenation beneath the restraining-abutment, which prevents the seeds from following the concatenated fibers and strips fiber from seed.

2. The method of removing fibrous material from its seeds, which consists in confining the fibers of such material in contact with a mass of fibers of the same sort from which the seeds have been removed maintained under pressure, and relatively moving the same and restraining the seeds from following such fibers, whereby said fiber is forcibly drawn or stripped from the seed, as and for the purpose set forth.

3. The method which consists in confining the fiber of the material to be ginned in contact with a resilient mass of ginned fibers under pressure to grip or grasp such fibers, moving such mass, and restraining the seeds of the material to be ginned, whereby said fibers are drawn or stripped from the seeds, as and for the purpose set forth.

4. The method which consists in confining the fiber of the material to be ginned in contact with a resilient mass of ginned fibers under pressure to grip or grasp such fibers, then moving such mass and restraining the seeds of the material to be ginned, whereby the fiber is stripped or drawn from the seeds, and finally moving such seed material with reference to the line of draw exerted upon the fibers thereof, as and for the purpose set forth.

5. The method which consists in confining the fiber of the material to be ginned in contact with a mass of ginned fibers of the same material under pressure to grip or grasp such fiber, then moving such mass and restraining the seed of the material to be ginned, whereby the fiber is forcibly stripped or drawn from the seed, and finally removing the seed, as and for the purpose set forth.

6. The method which consists in moving a resilient mass of fibers maintained under pressure, then presenting seed material to an exposed portion of the surface of such mass, whereby the fiber of the seed material is gripped or grasped by such mass at the exposed point, and finally restraining the seed from following the movement of such mass, whereby the fiber of the seed material is forcibly stripped or drawn from its seed, as and for the purpose set forth.

7. The method which consists in relatively moving a mass of fibers that have been stripped of their seeds and are maintained under pressure and a surface against which such mass bears, then presenting the fibers of the seed material to be grasped or engaged between such relatively moving surfaces, whereby such fibers are gripped or engaged by said previously-stripped fibers and are stripped from the seed, as and for the purpose set forth.

8. The method which consists in relatively moving a mass of stripped fibers maintained under pressure and a surface against which such mass bears, then presenting the fibers of seed material to be engaged or gripped between such relatively moving surfaces, whereby such fibers are gripped or engaged by such mass of fibers, and finally moving such seed material transverse to the line of draw exerted upon the fibers thereof, as and for the purpose set forth.

9. The method which consists in engaging the fiber of the material to be ginned with a mass of like fibers previously ginned and held under pressure to grip or grasp such fiber, then moving such mass and restraining the seeds of the material to be ginned, whereby said fibers are drawn or stripped from the seeds and added to such mass and condensed and compressed into bale form, as and for the purpose set forth.

10. The method of ginning cotton which consists in withdrawing from a mass of seed-cotton a body of fibers in the form of a stream or concatenation, condensing the said stream to a continually-increasing density and finally passing the same through a throat from which the seeds attached to the fibers are excluded by reason of their size.

11. The method of ginning cotton which consists in assembling seed-cotton into a mass, condensing a portion of the mass to a gradually-increasing density and at the same time drawing the condensed portion away from the mass, passing the same through a contracting throat too small to permit the entrance of seeds, and at the same time subjecting the material about to enter to a sidewise motion in a direction transverse to the line of draft of the fibers.

In witness whereof I have hereunto set my hand, this 10th day of April, 1900, in the presence of the subscribing witnesses.

GEORGE A. LOWRY.

Witnesses:
  WM. WILCOX,
  PERCY LITCHFIELD,